United States Patent
Bode et al.

(10) Patent No.: US 6,615,098 B1
(45) Date of Patent: Sep. 2, 2003

(54) METHOD AND APPARATUS FOR CONTROLLING A TOOL USING A BASELINE CONTROL SCRIPT

(75) Inventors: Christopher A. Bode, Austin, TX (US); Alexander J. Pasadyn, Austin, TX (US); Anthony J. Toprac, Austin, TX (US); Joyce S. Oey Hewett, Austin, TX (US); Anastasia Oshelski Peterson, Austin, TX (US); Thomas J. Sonderman, Austin, TX (US); Michael L. Miller, Cedar Park, TX (US)

(73) Assignee: Advanced Micro Devices, Inc., Austin, TX (US)

(*) Notice: Subject to any disclaimer, the term of this patent is extended or adjusted under 35 U.S.C. 154(b) by 113 days.

(21) Appl. No.: 09/789,871

(22) Filed: Feb. 21, 2001

(51) Int. Cl.[7] .......................... G06F 17/60; G06F 19/00
(52) U.S. Cl. ....................................... 700/121; 700/116
(58) Field of Search .......................... 700/97, 99, 100, 700/121, 108, 109, 110, 111, 116; 717/162, 163

(56) References Cited

U.S. PATENT DOCUMENTS

| | | | | |
|---|---|---|---|---|
| 4,698,766 A | | 10/1987 | Roberts et al. ............. | 364/468 |
| 5,432,702 A | * | 7/1995 | Barnett ...................... | 700/116 |
| 5,751,581 A | * | 5/1998 | Tau et al. ................... | 700/115 |
| 6,465,263 B1 | * | 10/2002 | Coss et al. .................. | 438/14 |
| 6,484,064 B1 | * | 11/2002 | Campbell ................... | 700/100 |
| 2002/0087229 A1 | * | 7/2002 | Pasadyn et al. ............. | 700/121 |

FOREIGN PATENT DOCUMENTS

| | | |
|---|---|---|
| GB | 2 329 041 | 3/1999 |
| WO | WO 00/36479 | 6/2000 |

* cited by examiner

Primary Examiner—Leo Picard
Assistant Examiner—Douglas S. Lee
(74) Attorney, Agent, or Firm—Williams, Morgan & Amerson, P.C.

(57) ABSTRACT

A method for controlling a manufacturing system includes processing workpieces in a plurality of tools; initiating a baseline control script for a selected tool of the plurality of tools; providing context information for the baseline control script; determining a tool type based on the context information; selecting a control routine for the selected tool based on the tool type; and executing the control routine to generate a control action for the selected tool. A manufacturing system includes a plurality of tools adapted to process workpieces, a control execution manager, and a control executor. The control execution manager is adapted to initiate a baseline control script for a selected tool of the plurality of tools and provide context information for the baseline control script. The control executor is adapted to execute the baseline control script, determine a tool type based on the context information, select a control routine for the selected tool based on the tool type, and execute the control routine to generate a control action for the selected tool.

34 Claims, 6 Drawing Sheets

METHOD AND APPARATUS FOR CONTROLLING A TOOL USING A BASELINE CONTROL SCRIPT

BACKGROUND OF THE INVENTION

1. Field of the Invention

This invention relates generally to the field of semiconductor device manufacturing and, more particularly, to a method and apparatus for controlling a tool using a baseline control script.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Configuration control and efficiency issues are prevalent in a distributed computing environment, such as a factory-wide APC system. Typically, there are numerous software developers writing control code to construct the process controllers. One particular developer may work extensively developing controllers of a certain type. It is common for each developer to have a unique programming style, and to rely on routines that they have created themselves. For example, each developer may have a set of routines for interfacing with databases or other entities within the APC framework and for performing various math functions and basic utility functions.

One problem associated with such an arrangement is that there is little consistency between process control scripts. The large number of custom scripts also presents a configuration control problem and an efficiency problem. Developers may spend considerable time duplicating code that has already been developed, perhaps for a different type of process controller that a different developer has created. Debugging non-standardized code is also more time-consuming and further reduces efficiency.

The present invention is directed to overcoming, or at least reducing the effects of, one or more of the problems set forth above.

SUMMARY OF THE INVENTION

One aspect of the present invention is seen in a method for controlling a manufacturing system. The method includes processing workpieces in a plurality of tools; initiating a baseline control script for a selected tool of the plurality of tools; providing context information for the baseline control script; determining a tool type based on the context information; selecting a control routine for the selected tool based on the tool type; and executing the control routine to generate a control action for the selected tool.

Another aspect of the present invention is seen in a manufacturing system including a plurality of tools adapted to process workpieces, a control execution manager, and a control executor. The control execution manager is adapted to initiate a baseline control script for a selected tool of the plurality of tools and provide context information for the baseline control script. The control executor is adapted to execute the baseline control script, determine a tool type based on the context information, select a control routine for the selected tool based on the tool type, and execute the control routine to generate a control action for the selected tool.

BRIEF DESCRIPTION OF THE DRAWINGS

The invention may be understood by reference to the following description taken in conjunction with the accompanying drawings, in which like reference numerals identify like elements, and in which.

Figure 1:
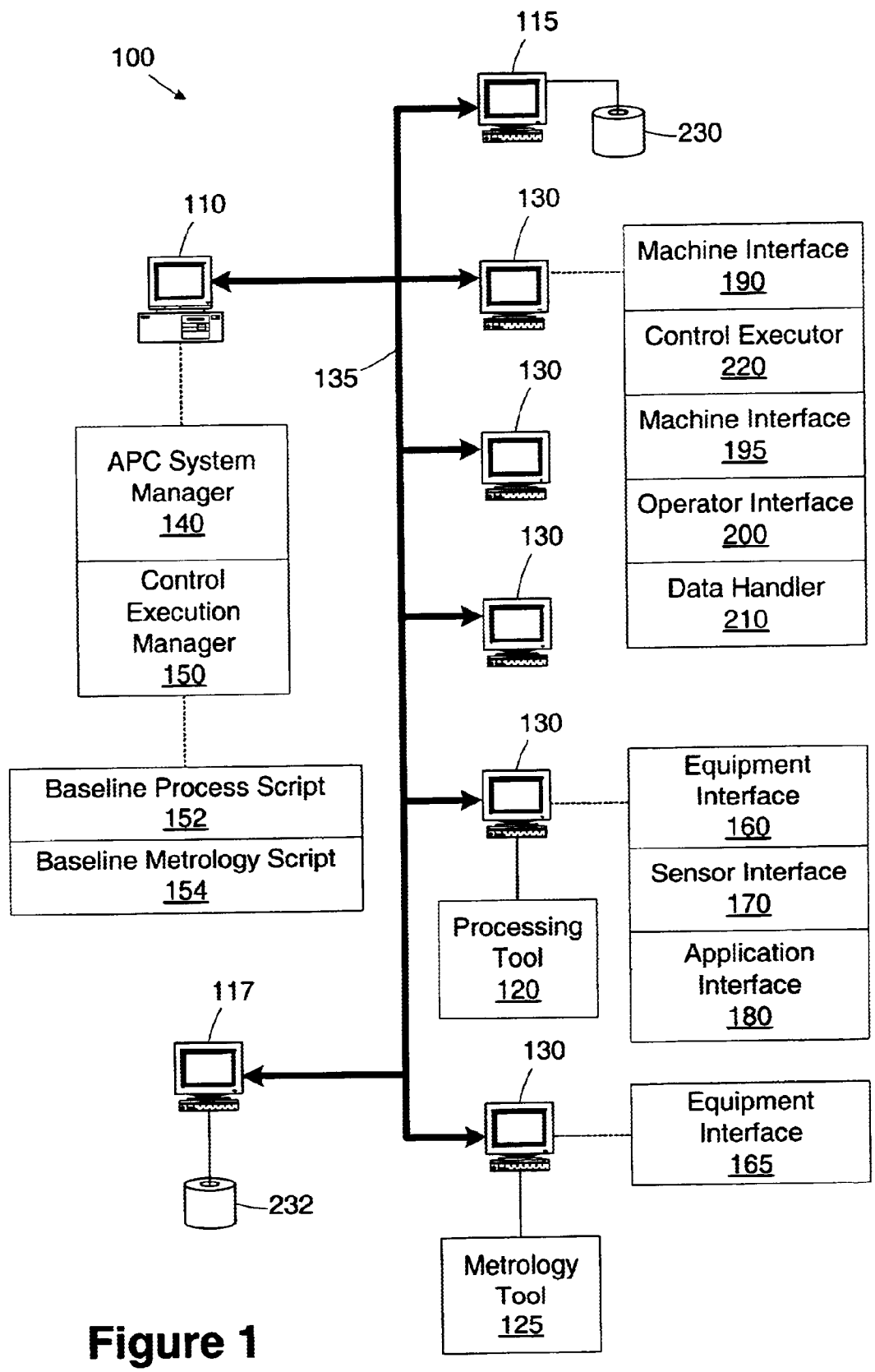
FIG. 1 is a simplified block diagram of an advanced process control (APC) system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and first to FIG. 1, a simplified block diagram of an advanced process control (APC) system 100 is shown. The APC System 100 is a distributed software system of interchangeable, standardized software components permitting run-to-run control and fault detection/classification. The software components implement an architectural standard based on a Semiconductor Equipment and Materials International (SEMI) Computer Integrated Manufacturing (CIM) Framework compliant system technologies specification and an Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. This particular architecture relies heavily on software utilizing object oriented programming and employs the Object Management Group's (OMG) Common Object Request Broker Architecture (CORBA) and CORBA Services specifications for distributed object systems. Information and specifications for the OMG CORBA architecture are also readily, publicly available. An exemplary software system capable of being adapted to perform the functions of the APC system 100 as described herein is the Catalyst system offered by KLA-Tencor, Inc.

The components communicate with each other using the CORBA Interface Definition Language (IDL) and rely on a common set of services to support their interaction. A standard set of distributed-object services are defined by the OMG. Among these services are:

CORBA—the standard-based communications protocol used for all direct component-to-component interaction. Standard interfaces can be defined according to an object-oriented, remote invocation communications model. These interfaces and all APC communications are defined using IDL. Components communicate by invoking operations on each others interfaces. Data is passed between components as operation parameters and return values.

OMG Event Service—supports a synchronous communications between components. Many of the APC objects emit events as they change state. These events are received by interested event subscribers. Examples of event usage within the APC system include, but are not limited to, communication component state (including error state), notification of fault alarms detected by fault detection and classification software, and reporting of machine status and collected data.

OMG Trading Service—enables a component to find another component with which to interact. When a component is installed, a description of its services (a services offer) is exported to the Trading Service. Another component can later request a list of service providers that meet certain criteria. The Trading Service supplies a list of other components that can provide the requested service. That capability is used upon component startup to allow one component to find other components with which it must interact. It is also used upon Plan Startup when a Plan Execution component needs to find Capability Providers to provide the required capabilities specified in the plan.

These services are well known in the art. OMG's CORBA/IIOP Specifications document and CORBA Services Specification documents are widely distributed among those in the art and provide greater detail.

In the illustrated embodiment, the APC system 100 is adapted to control a semiconductor manufacturing environment. The components communicate with each other using CORBA Interface Definition Language (IDL). The cooperating software components manage process control plans/strategies; collect data from process equipment, metrology tools, and add-on sensors; invoke various process control applications/algorithms with this information; and update process models and modify/download tool operating recipe parameters as appropriate. The APC system 100 is a factory-wide software system for controlling semiconductor production processes, but this is not necessary to the practice of the invention. The strategies taught by the present invention can be applied to different computer systems, on any scale.

In an exemplary implementation, the APC system 100 includes an APC host computer 110, database servers 115, 117, a processing tool 120, a metrology tool 125, and one or more workstations 130. The components of the APC system are interconnected through a bus 135. The bus 135 may actually include multiple layers and use multiple protocols. Overall operation of the APC system 100 is directed by an APC system manager 140 resident on an APC host computer 110. The APC system manager 140 provides administrative, configuration, event, and state services for all servers developed for the APC Framework; definition, grouping, installation, and management of the components in the APC system 100; centralized services for capturing activity and trace information for diagnostic and monitoring purposes; a centralized repository of component configuration information, including setup values, system environment settings; and lists of dependent objects and event channels. However, in alternative embodiments, these functions may be divided into one or more software components, e.g., a base manager, a system manager, a logger, and a registry.

The APC system 100 includes a network of processing modules. These processing modules are sometimes referred to as "integration components." Integration components serve as interfaces to existing factory systems, and provide capabilities for running APC Plans. An "APC Plan" is an application program called to perform some specific task, as is discussed more fully below. The integration components are shown as they might be hosted by the various processing resources within the APC system 100. These specific hosting locations are provided for exemplary purposes. The processing resources are interconnected, and the various software components may be either distributed among the various computers or centralized, depending on the complexity of the system. Each of the integration components in this particular embodiment, are software-implemented. They are programmed in C++ using object-oriented programming techniques as are known in the art. An advantage of the APC system 100 is its modular structure, which provides portability of software components. The integration components include, but are not limited to, the APC system manager 140; a control execution manager 150; equipment interfaces 160, 165 associated with the tools 120, 125; a sensor interface 170 associated with the processing tool 120; an application interface 180; machine interfaces 190, 195; an operator interface 200; and a data handler 210.

The control execution manager 150 is the component primarily responsible for "choreographing" the operation of the APC System 100. The control execution manager 150 interprets APC plans, executes main scripts and subscripts, and invokes event scripts as events dictate. A variety of plans, scripts, and subscripts may be used in various implementations. The specific number and function of various plans, scripts, and subscripts will be implementation specific. For instance, the present embodiment includes, but is not limited to, the following plans:

a data collection plan—a data structure used by sensor and machine interfaces defining the requirements for what data should be collected from a specific processing equipment, and how that data should be reported back;

a duration plan—a plan that defines trigger conditions and trigger delays that cause sensors to act, e.g., start data collection, stop data collection;

a reporting plan—a plan that defines what to do with the collected data, as well as when to signal the data's availability; and a sampling plan—a plan that defines the frequency at which the data is to be collected by an external sensor;

a control plan—a collection of control scripts designed to be used together to perform APC activities; and a control script—a sequence of actions/activities that the APC system is to execute under a particular defined situation.

The control execution manager 150 coordinates the execution of user-defined process control plans among all the integration components for a given tool, such as the processing tool 120. When instructed, the control execution manager 150 retrieves a plan and its associated scripts. It preprocesses subscripts to provide routines to main and event scripts. It also obtains a list of the capabilities necessary to execute the plan, as specified in the plan and connects to the proper integration components providing the required capabilities.

The control execution manager 150 then delegates responsibility to run the plan to a control executor 220. In the illustrated embodiment, the control execution manager 150 uses baseline control scripts for determining control actions to be performed. A baseline process script 152 is designated for use with processing tools, such as the processing tool 120, and a baseline metrology script 154 is designated for use with metrology tools, such as the metrology tool 125. A more detailed discussion of the baseline scripts 152, 154 is provided below in reference to FIGS. 2 through 6.

The control execution manager 150 creates a control executor 220 based on the appropriate baseline process script 152 or baseline metrology script 154 to sequentially execute the plan and report completion of the plan or errors in the execution of the plan back to the control execution manager 150. Thus, while the control execution manager 150 is responsible for the overall management of all plans executed, each control executor 220 is responsible for running only one plan. The control executor 220 is created by the control execution manager 150, exists for the life of the plan, and is destroyed by the control execution manager 150 after reporting that the plan is completed or aborted. The control execution manager 150 can start multiple plans concurrently via multiple control executors 220.

The machine interfaces 190, 195 bridge the gap between the APC framework, e.g., the APC system manager 140, and the equipment interfaces 160, 165. The machine interfaces 190, 195 interface the processing or metrology tools 120, 125 with the APC framework and support machine setup, activation, monitoring, and data collection. In this particular embodiment, the machine interfaces 190, 195 primarily translate between specific communications of the equipment interfaces 160, 165 and CORBA communications of the APC framework. More particularly, the machine interfaces 190, 195 receive commands, status events, and collected data from the equipment interfaces 160, 165 and forward as needed to other APC components and event channels. In turn, responses from other APC components are received by the machine interfaces 190, 195 and routed to the equipment interfaces 160, 165. The machine interfaces 190, 195 also reformat and restructure messages and data as necessary. The machine interfaces 190, 195 support the startup/shutdown procedures within the APC System Manager 140. They also serve as APC data collectors, buffering data collected by the equipment interfaces 160, 165 and emitting appropriate data collection events.

The sensor interface 170 collects data generated by the sensors monitoring the operation of the processing tool 120. The sensor interface 170 provides the appropriate interface environment to communicate with external sensors, such as LabVIEW or other sensor, bus-based data acquisition software. The application interface 180 provides the appropriate interface environment to execute control plug-in applications such as LabVIEW, Mathematica, ModelWare, MatLab, Simca 4000, and Excel. The sensors may be supplied with the processing tool 120 by the original equipment manufacturer (OEM) or they may be "add-on" sensors installed subsequent to acquisition from the OEM. The sensor interface 170 collects data generated by the sensors. The sensors may generate data on, for instance, the pressure and temperature of the operating conditions. The application interface 180 takes data from the control executor 220 and performs calculations or analysis on that data. The results are then returned to the control executor 220. The machine interface 190 and the sensor interface 170 use a common set of functionality to collect data to be used. The equipment interface 160 gathers the respective data collected by the sensors on the processing tool 120 and transmits the gathered data to the machine interface 190.

The operator interface 200 facilitates communication between a wafer fabrication technician and the APC system 100 via a graphical user interface (GUI) (not shown). The GUI may be a Windows® or UNIX based operating system. However, this is not necessary to the practice of the invention. Indeed, some alternative embodiments might not even employ a GUI and may communicate through a disk operating system (DOS) based operating system. The operator interface 200 displays dialogue boxes to provide information, request guidance and collect additional data. Through a CORBA interface, the operator interface 200 component allows technicians to display a variety of popup dialogs simultaneously on any number of display groups. The operator interface 200 also maintains a group of displays in which a popup could appear. The operator interface 200 may also provide an announcement operation, i.e., a one-way message that displays a simple popup with message and "OK" button.

The data handler 210 receives data generated by other APC system 100 components and stores the data in data stores 230, 232 (e.g., relational databases) on the database servers 115, 117. The data handler 210 may be adapted to receive standard structured query language (SQL) commands, or alternatively, the data handler 210 may translate a different type of access protocol to generate a SQL command or some other protocol command. Centralizing the data storage functions increases the portability of the various components.

Figure 2:
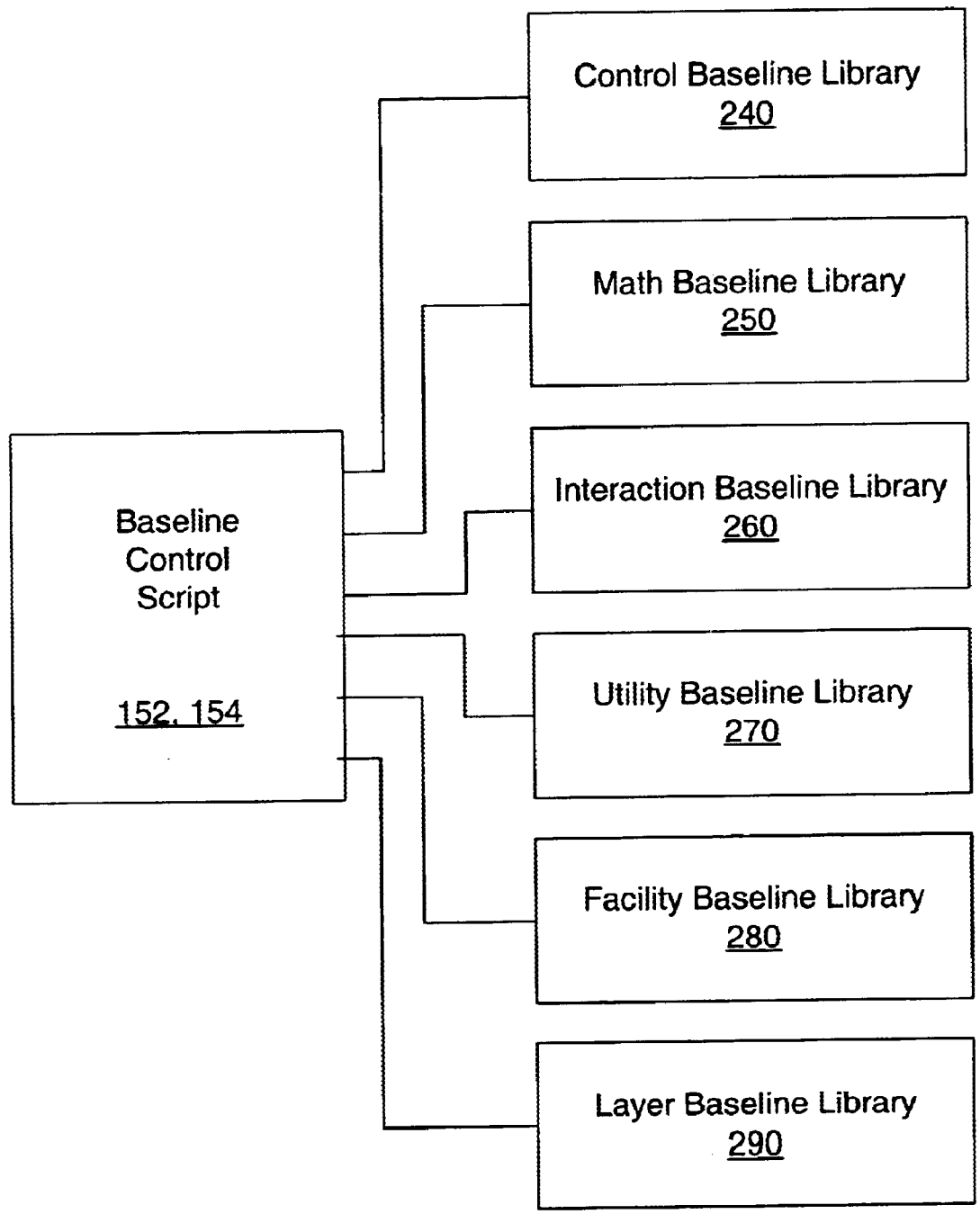
FIG. 2 is a diagram illustrating links between a baseline control scripts in the system of FIG. 1 and a variety of shared baseline libraries.

The general operation of the baseline control scripts 152, 154 is described with reference to the simplified block diagram provided in FIG. 2, which illustrates the links between the baseline control scripts 152, 154 and a variety of shared baseline libraries. In general, a baseline control script 152, 154 provides a framework for developing control scripts within the APC system 100. The baseline control scripts use shared baseline components stored in libraries. In the illustrated embodiment, the shared baseline components include a control baseline library 240 for defining control algorithms; a math baseline library 250 for defining commonly used math functions (e.g., sum, mean, median, etc.); an interaction baseline library 260 for defining communication aspects of script execution (e.g., interaction with the data stores 230, 232, the machine interface 195, the equipment interface 160 through the machine interface 195, the operator interface 200, and other such external components); a utility baseline library 270 for defining shared common functions; a facility library 280 for defining functions or exceptions to the routines in the other libraries 240, 250, 260, 270 that are specific to the facility; and a layer library 290 for defining the layer (ex. poly gate layer) from the particular operation ID included in the call to the baseline control script. The baseline libraries 240, 250, 260, 270, 280, 290 may be linked to during the operation of the baseline control scripts 1 52, 154 by the control executor 220.

In general, the baseline control script 152, 154 determines the nature of the control action, based on the information included in the call to the script and the information in the facility and layer baseline libraries 280, 290. The baseline control script 152, 154 links to the control baseline library 240 to access the necessary control functions. The baseline control script 152, 154 links to the interaction baseline library 260 to access functions for gathering the data used to perform the control action and to communicating with the equipment interface 160 for updating the operating recipe of the tool 120, 125. The functions in the math baseline library 250 may be called by other functions in the baseline control script 152, 154 or other libraries, as necessary.

Figure 3:
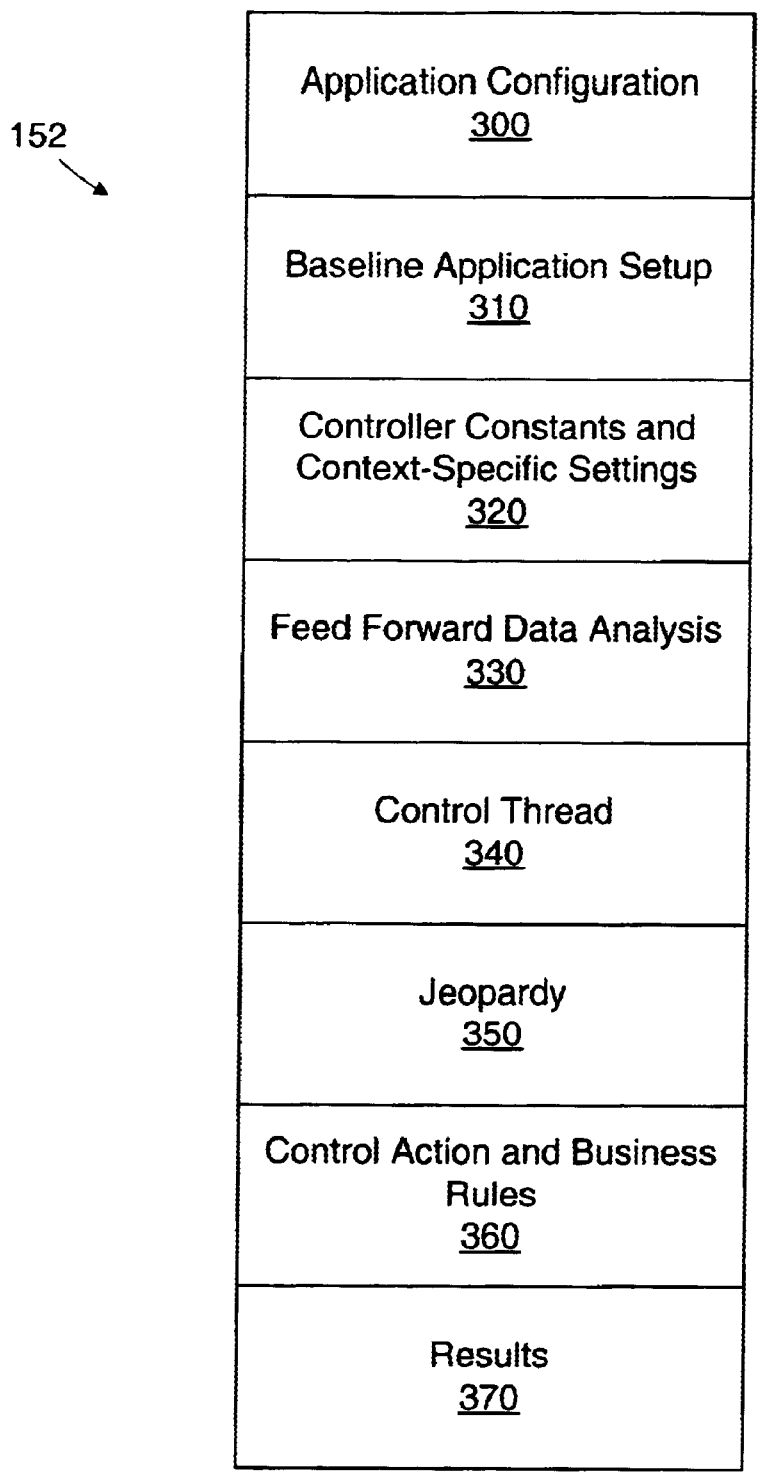
FIG. 3 is a simplified block diagram illustrating the organization of a baseline process script.

Turning now to FIG. 3, a simplified block diagram illustrating the organization of the baseline process script 152 is provided. The baseline process script 152 includes an application configuration block 300, a baseline application setup block 310, a controller constants and context-specific settings block 320, a feed forward data analysis block 330, a control thread block 340, a jeopardy block 350, a control action and business rules block 360, and a results block 370.

Within the application configuration block 300, user global configuration variables are defined for use by the controller based on the information contained in the call from the equipment interface 160. This includes the values of variables from the recipe management system (RMS) (i.e., a global database of recipe settings) and the required context variables. Context variable values define the control thread and typically consist of values for variables such as tool identification code, lot number, operation number, and so forth. In addition, any needed baseline variables are also given values. Examples include an email list for error notifications, values for timeouts, the maximum number of wafers allowed in a lot considered as a "child" lot, previous layer information that the controller uses (feed forward information) and so forth.

The baseline application setup block 310 uses the values for lot number and quantity of wafers, as set in the application configuration block 300 and returns values for lot number, family name, parent name, facility, number of wafers, and status (i.e., whether lot is a parent or a child lot). The baseline application setup block 310 also sets the default list of terminals to which the controller will send popup windows, as well as the first part of all popup window titles.

The controller constants and context-specific settings block 320 uses the previously defined context and RMS information to set the values that the controller uses to calculate control moves. For example, the controller constants and context-specific settings block 320 may use the context information (or "thread" designation) to set the value of a control model parameter according to the value defined in RMS. A specific example would be setting the value for etch rate used in a control model according to the context of the particular etch chamber and the value for that etch chamber's etch rate as defined in RMS. In addition, the controller constants and context-specific settings block 320 retrieves feed forward information from the database using a query by lot number and layer name as set in the application configuration block 300.

The feed forward data analysis block 330 checks the elements in an array of data associated with a given lot and fills in default values for missing values. For example, the target of a previous process may be used to set the value of a missing measurement needed as part of the feed forward information used by the controller. Other methods for setting the value of missing feed forward information, in lieu of using a default value, may also be performed in the feed forward data analysis block 330.

The control thread block 340 sets the values of the keys and state structures needed for querying the data stores 230, 232 to retrieve control states associated with the current control thread. The keys are used to retrieve the thread state data from the data stores 230, 232. The control thread block 340 searches for the thread state data is in the stack of ordered data for recent lots processed with this thread context. If such values are found they are passed to a user-defined finction containing the control model, which calculates and returns values for the thread states. If no values in the stack are found, the control thread block 340 searches up the hierarchy and retrieves the data from the first hierarchy level that has values for the thread states. The stack and all hierarchy levels are assumed to contain similar data, but at differing degrees of precision.

The jeopardy block 350 performs a lookup in the database and retrieves the value for the number of lots in the jeopardy stack (i.e., the stack of lots which were processed on the given thread since the last metrology operation). This value is compared to a threshold value for number of lots in this jeopardy category, a value typically specified in RMS. If this threshold value is not exceeded, the controller continues. If the threshold value is exceeded, the controller aborts with a popup display that instructs the operator to perform a metrology event on a lot from the list of lots in the jeopardy stack.

The control action and business rules block 360 is the heart of the controller. The control action and business rules block 360 computes the controller inputs (process recipe updates) from the state and target information. These results are placed in a global control results array. Next, the control action and business rules block 360 executes business rules, limits checking on the process recipe updates, and/or sets the process recipe updates according to user-input overrides of the controller.

The results block 370 takes the output from the control action and business rules block 360, including process recipe updates, data calculations/formatting, or events, buffers it together and formats the data. The results block 370 sends the buffered data to the equipment interface 160 and initiates setup/start machine calls by the machine interface 195 to the equipment interface 160. Next, the results block 370 stores the data is stored in the data stores 230, 232 against the lot number and layer for the current context (thread). The jeopardy stack is also updated with the current lot as an additional lot processed since the last metrology event.

Figure 4:
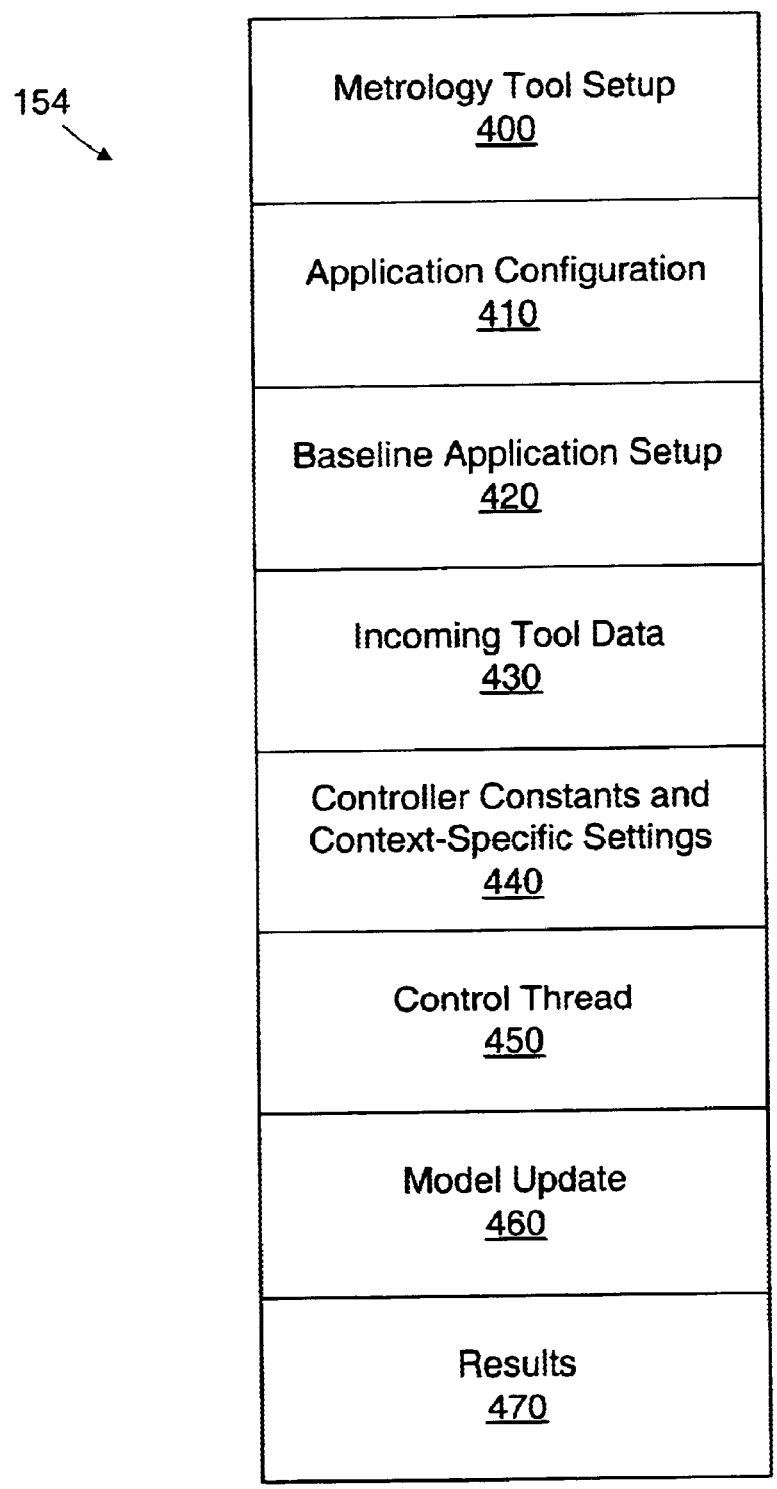
FIG. 4 is a simplified block diagram illustrating the organization of a baseline metrology script.

Referring now to FIG. 4, a simplified block diagram illustrating the organization of the baseline metrology script 154 is provided. The baseline metrology script 154 includes a metrology tool setup block 400, an application configuration block 410, a baseline application setup block 420, an incoming tool data block 430, a controller constants and context-specific settings block 440, a control thread block 450, a model update block 460, and a results block 470.

Within the metrology tool setup block 400, data collection is initiated and any buffered data is sent to the control executor 220. The machine interface 190 is also initiated to send setup/start machine calls to the equipment interface 165.

The application configuration block 410 and the baseline application setup block 420 perform functions similar to the blocks of the same name described above in relation to the baseline process script 152.

The incoming tool data block 430 pauses the baseline metrology script 154 to wait for a data set from a data source, typically a metrology tool. The time period for waiting for this event and the name of the event which will release the script pause are specified in the incoming tool data block 430.

The controller constants and context-specific settings block 440 also performs functions similar to the block of the same name described above in relation to the baseline process script 152.

The control threads block 450 sets the values of the keys and state structures needed for storing calculated control states for the current thread to the data stores 230, 232. In addition, the control threads block 450 computes all values needed to update the thread states. This function read the defined global variables and computes the needed results. The results include statistics or values that are used in updating the controller, such as lot averages, process rates, and deviations from targets or predictions. The results of this function are placed in the global control results array.

The model update block 460 is used to perform business rules, spec limit checking, and overrides of the controller. This function reads the defined global variables and sets the final results. The model update block 460 is responsible for setting the values that will be used to update the controller as well as the values that will be logged to the control history. The results of this function are placed in the global control results array.

The results block 470 takes the output from the controller constants and context specific settings block 440, buffers it and formats the data to be compatible with the equipment interface 165. The data output by the baseline metrology script 154 is also written to a control history file. A header for the control history is generated based on the supplied variable names. The log files have the header encoded in the first line of the file. If the computed header does not match the first line of the file, the existing file is renamed, and a new one is started.

Figure 5:
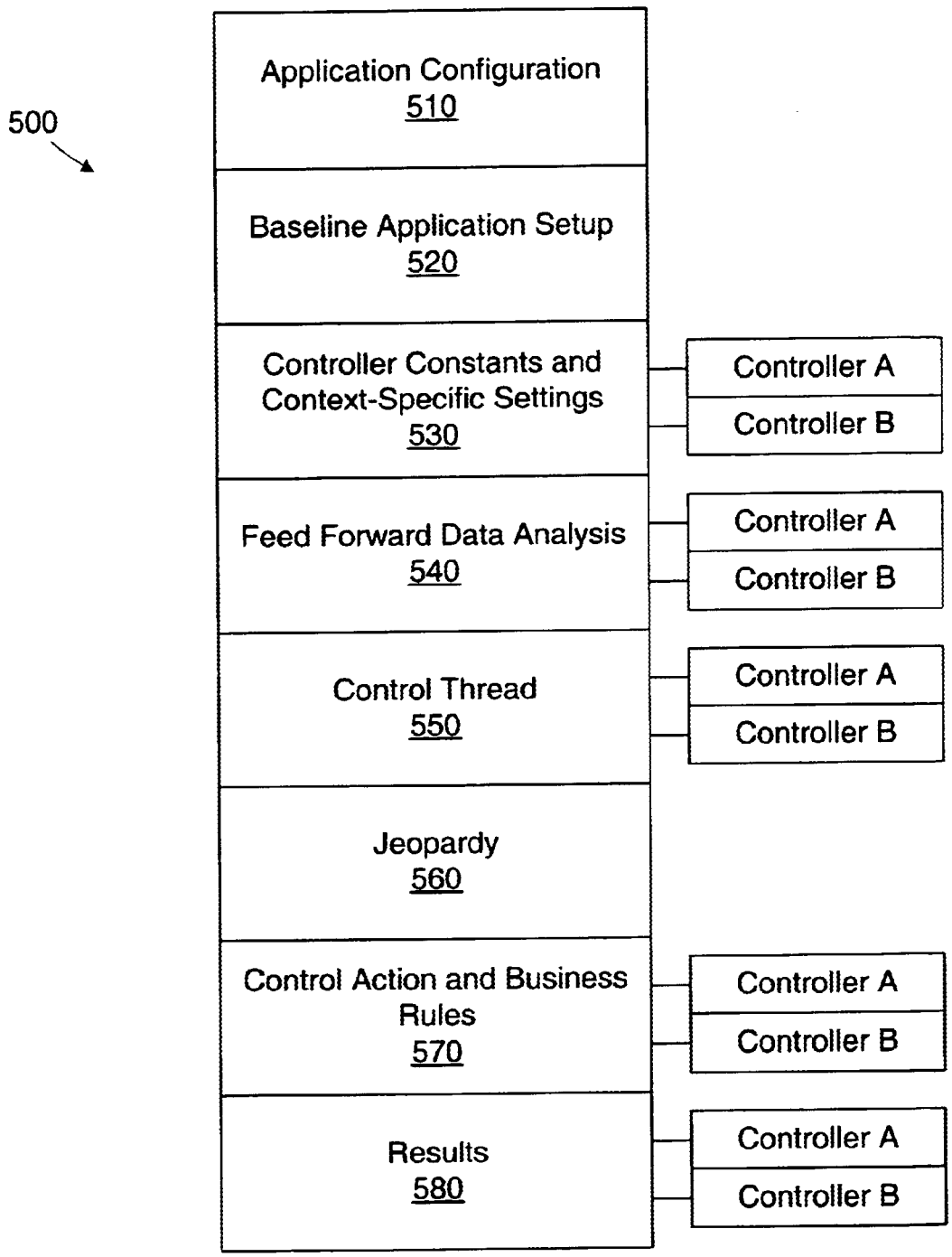
FIG. 5 is a simplified block diagram illustrating the organization of a multiple controller baseline process script.

Turning now to FIG. 5, a simplified block diagram of a multiple controller baseline process script 500 capable of implementing multiple control actions on a single processing tool 120 in accordance with another embodiment of the present invention is provided. For example, a photolithography stepper may have both an overlay controller and a critical dimension controller. The controllers use feedback from processed wafers to adjust various stepper parameters such as exposure dose, exposure time, focus, etc. A deposition tool, such as a tool for forming polysilicon layers, may also have multiple controllers for controlling parameters such-as polysilicon grain size and polysilicon layer thickness.

When the baseline process script 500 is called, it determines the necessary control actions based on the information included in the call. The context in which a lot is to be processed determines which of the controllers that will be run. The context is defined by the operation ID, the entity ID, the product ID, and other such discrete identifiers that determine the requirements for a particular run. First, the entity ID is used to determine the general class of tool type (e.g., stepper, etcher, furnace, etc.). For example, if the entity ID identifies the processing tool 120 as a stepper, the stepper control code is called.

Within the stepper control code, the context variables within the script are checked to determine which individual controller are to be called. The operation ID indicates the process will be run (e.g., poly gate mask vs. second inter-level dielectric layer mask(ILD)). Each controller applies to a set of context situations and will only run if all of those context conditions are met. For example, the CD controller may run for a poly gate mask, but may not run at the second ILD mask process. The overlay controller, on the other hand, may run at both mask events.

The baseline process script 500 provides the flexibility to match the required tool code based on the tool set (e.g., steppers) and prepare to run all of the available controllers (e.g., overlay, CD, etc.). The same main script is run, the same subroutines are available to be called, but only the controllers needed in the current context are activated.

The multiple controller baseline process script 500 includes an application configuration block 510, a baseline application setup block 520, a controller constants and context-specific settings block 530, a feed forward data analysis block 540, a control thread block 550, a jeopardy block 560, a control action and business rules block 570, and a results block 580. The multiple controller baseline process script 500 operates in a similar manner to the baseline process script 152, except as described below.

The controller constants and context-specific settings block 530 determines which of the controllers is applicable (e.g., controller A, controller B, or both) and uses the previously defined context and RMS information to set the values that each controller uses to calculate control moves. The controller constants and context-specific settings block 530 also retrieves feed forward information for each of the required controllers from the database using a query by lot number and layer name as set in the application configuration block 510. The feed forward data analysis block 540 checks the elements in an array of data associated with a given lot and fills in default values for missing values for each controller.

The control thread block 550 sets the values of the keys and state structures needed for querying the data stores 230, 232 to retrieve control states associated with the current control threads for each of the active controllers. The keys are used to retrieve the thread state data from the data stores 230, 232. The control thread block 550 searches for the thread state data is in the stack of ordered data for recent lots processed with this thread context. If such values are found they are passed to a user-defined function containing the control model, which calculates and returns values for the thread states. If no values in the stack are found, the control thread block 340 searches up the hierarchy and retrieves the data from the first hierarchy level that has values for the thread states. The stack and all hierarchy levels are assumed to contain similar data, but at differing degrees of precision.

The control action and business rules block 570 computes the controller inputs (process recipe updates) from the state and target information for each of the controllers. Because multiple controllers are used, one controller may affect the state information relied on by the other controller for determining its control action. Hence, the controllers may be assigned relative priority values for determining the order in which their control actions are determined. The higher priority controller may update the state information data for the second controller based on its control action determination. The second controller than determines its control action based on the modified state information. By cooperating in such a manner, the controllers will not compete with each other regarding operating recipe changes.

The results block 580 gathers the control action output from all of the active controllers, buffers the data, and formats the data. The results block 580 sends the buffered data to the equipment interface 160 and initiates setup/start machine calls by the machine interface 195 to the equipment interface 160. Next, the results block 580 stores the data is stored in the data stores 230, 232 against the lot number and layer for the current context (thread) and updates the jeopardy stack.

Figure 6:
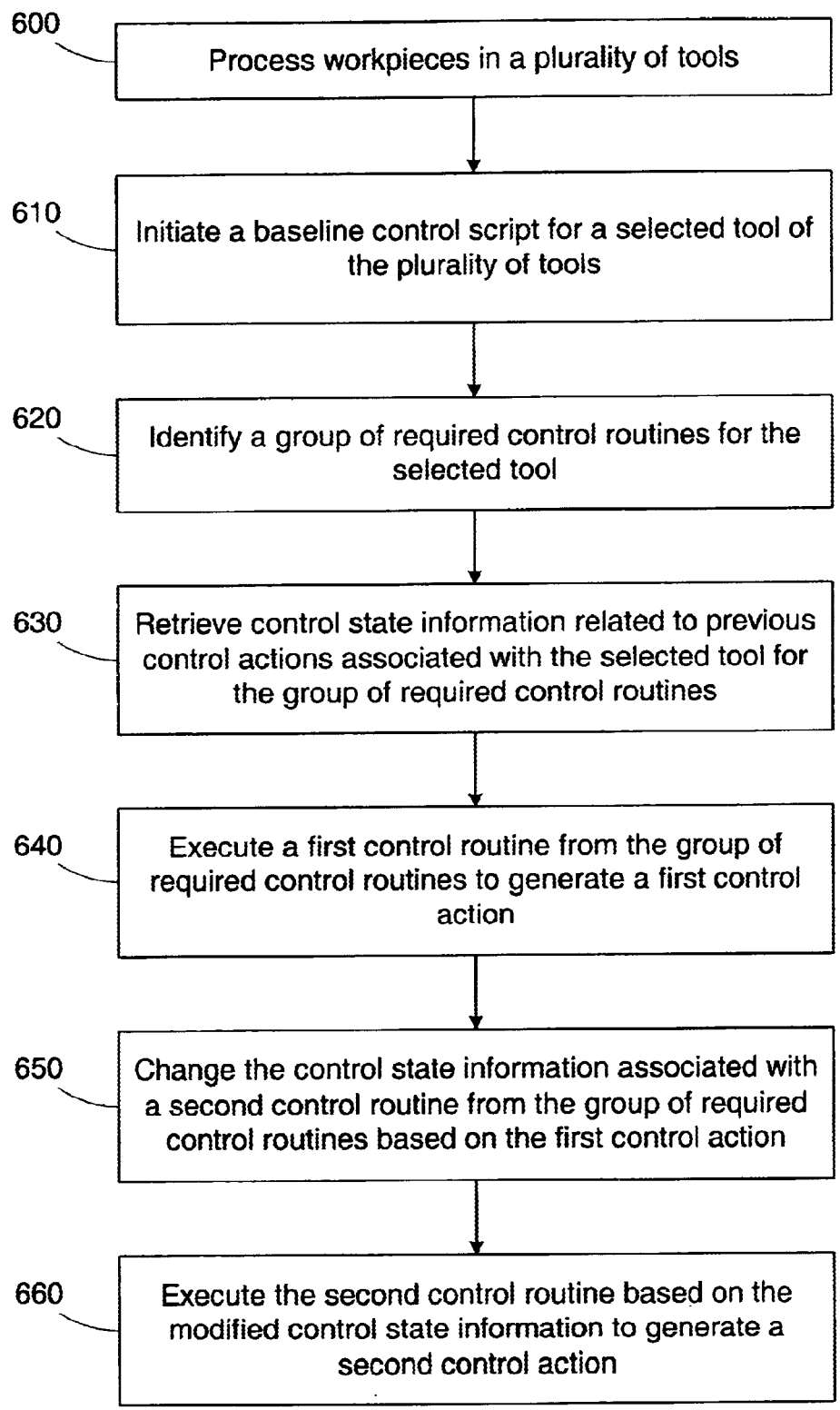
FIG. 6 is a simplified flow diagram of a method for integrating multiple controllers in accordance with another illustrative embodiment of the present invention.

Referring now to FIG. 6, a simplified flow diagram of a method for integrating multiple controllers in accordance with another illustrative embodiment of the present invention is provided. In block 600, workpieces are processed in a plurality of tools. In block 610, a baseline control script is initiated for a selected tool of the plurality of tools (e.g., by the control execution manager 150). After initiation of the baseline control script, the control executor 220 performs the remaining tasks. In block 620, a group of required control routines for the selected tool is identified. In block 630, control state information is retrieved related to previous control actions associated with the selected tool for the group of required control routines. In block 640, a first control routine from the group of required control routines is executed to generate a first control action. In block 650, the control state information associated with a second control routine from the group of required control routines is changed based on the first control action. In block 660, the second control routine is executed based on the modified control state information to generate a second control action.

The particular embodiments disclosed above are illustrative only, as the invention may be modified and-practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling a manufacturing system, comprising:

processing workpieces in a plurality of tools;

initiating a baseline control script for a selected tool of the plurality of tools;

providing context information for the baseline control script;

determining a tool type based on the context information;

selecting a control routine for the selected tool based on the tool type; and executing the control routine to generate a control action for the selected tool.

2. The method of claim 1, wherein the selected tool has an operating recipe, and the method further comprises changing the operating recipe of the selected tool based on the control action.

3. The method of claim 1, wherein selecting the control routine further comprises linking to a library of control routines.

4. The method of claim 1, wherein executing the control routine further comprises retrieving control state information related to previous control actions associated with the selected tool.

5. The method of claim 1, wherein the context information comprises an entity identification code associated with the selected tool and determining the tool type further comprises determining the tool type based on the entity identification code.

6. The method of claim 1, wherein the context information comprises an operation identification code, and selecting the control routine further comprises selecting the control routine based on the tool type and the operation identification code.

7. The method of claim 1, wherein the context information comprises a product identification code, and selecting the control routine further comprises selecting the control routine based on the tool type and the product identification code.

8. The method of claim 1, wherein the context information comprises an entity identification code, an operation identification code, and a product identification code, determining the tool type further comprises determining the tool type based on the entity identification code, and selecting the control routine further comprises selecting the control routine based on the tool type, the operation identification code, and the product identification code.

9. A method for controlling a manufacturing system, comprising:
   processing workpieces in a plurality of tools;
   initiating a baseline control script for a selected tool of the plurality of tools;
   providing context information for the baseline control script, the context information including an entity identification code;
   determining a tool type based on the entity identification code;
   linking to a library of control routines;
   selecting a control routine for the selected tool from the library of control routines based on the tool type; and
   executing the control routine to generate a control action for the selected tool.

10. The method of claim 9, wherein the selected tool has an operating recipe, and the method further comprises changing the operating recipe of the selected tool based on the control action.

11. The method of claim 9, wherein executing the control routine further comprises retrieving control state information related to previous control actions associated with the selected tool.

12. The method of claim 9, wherein the context information comprises an operation identification code, and selecting the control routine further comprises selecting the control routine based on the tool type and the operation identification code.

13. The method of claim 9, wherein the context information comprises a product identification code, and selecting the control routine further comprises selecting the control routine based on the tool type and the product identification code.

14. The method of claim 9, wherein the context information comprises an entity identification code, an operation identification code, and a product identification code, determining the tool type further comprises determining the tool type based on the entity identification code, and selecting the control routine further comprises selecting the control routine based on the tool type, the operation identification code, and the product identification code.

15. A manufacturing system, comprising:
   a plurality of tools adapted to process workpieces;
   a control execution manager adapted to initiate a baseline control script for a selected tool of the plurality of tools and provide context information for the baseline control script; and
   a control executor adapted to execute the baseline control script, determine a tool type based on the context information, select a control routine for the selected tool based on the tool type, and execute the control routine to generate a control action for the selected tool.

16. The system of claim 15, wherein the selected tool has an operating recipe associated therewith, and the control executor is adapted to change the operating recipe of the selected tool based on the control action.

17. The system of claim 15, wherein the control executor is adapted to link to a library of control routines to select the control routine.

18. The system of claim 15, wherein the control executor is adapted to retrieve control state information related to previous control actions associated with the selected tool.

19. The system of claim 15, wherein the context information comprises an entity identification code associated with the selected tool, and the control executor is adapted to determine the tool type based on the entity identification code.

20. The system of claim 15, wherein the context information comprises an operation identification code, and the control executor is adapted to select the control routine based on the tool type and the operation identification code.

21. The system of claim 15, wherein the context information comprises a product identification code, and the control executor is adapted to select the control routine based on the tool type and the product identification code.

22. The system of claim 15, wherein the context information comprises an entity identification code, an operation identification code, and a product identification code, and the control executor is adapted to determine the tool type based on the entity identification code and select the control routine based on the tool type, the operation identification code, and the product identification code.

23. The system of claim 15, further comprising:
   an equipment interface adapted to communicate with the selected tool; and
   a machine interface adapted to communicate with the equipment interface, wherein the control executor is adapted to link to a library of interaction functions for interfacing with the equipment interface and the machine interface.

24. The system of claim 15, wherein the control executor is adapted to link to a library of math functions to execute functions in the control routine.

25. A manufacturing system, comprising:
   a plurality of tools adapted to process workpieces;
   a control execution manager adapted to initiate a baseline control script for a selected tool of the plurality of tools and provide context information for the baseline control script, the context information including an entity identification code; and
   a control executor adapted to execute the baseline control script, determine a tool type based on the context information, link to a library of control routines, select a control routine for the selected tool from the library of control routines based on the tool type, and execute the control routine to generate a control action for the selected tool.

26. The system of claim 25, wherein the selected tool has an operating recipe, and the control executor is adapted to change the operating recipe of the selected tool based on the control action.

27. The system of claim 25, wherein the control executor is adapted to retrieving control state information related to previous control actions associated with the selected tool.

28. The system of claim 25, wherein the context information comprises an operation identification code, and the control executor is adapted to select the control routine based on the tool type and the operation identification code.

29. The system of claim 25, wherein the context information comprises a product identification code, and the control executor is adapted to select the control routine based on the tool type and the product identification code.

30. The system of claim 25, wherein the context information comprises an entity identification code, an operation identification code, and a product identification code, and the control executor is adapted to determine the tool type based on the entity identification code and select the control routine based on the tool type, the operation identification code, and the product identification code.

31. The system of claim 25, further comprising:

an equipment interface adapted to communicate with the selected tool; and a machine interface adapted to communicate with the equipment interface, wherein the control executor is adapted to link to a library of interaction functions for interfacing with the equipment interface and the machine interface.

32. The system of claim 25, wherein the control executor is adapted to link to a library of math functions to execute functions in the control routine.

33. A manufacturing system, comprising:

a plurality of tools adapted to process workpieces;

means for initiating a baseline control script for a selected tool of the plurality of tools;

means for providing context information for the baseline control script;

means for determining a tool type based on the context information;

means for selecting a control routine for the selected tool based on the tool type; and means for executing the control routine to generate a control action for the selected tool.

34. A manufacturing system, comprising:

a plurality of tools adapted to process workpieces;

means for initiating a baseline control script for a selected tool of the plurality of tools;

means for providing context information for the baseline control script, the context information including an entity identification code;

means for determining a tool type based on the entity identification code;

means for linking to a library of control routines;

means for selecting a control routine for the selected tool from the library of control routines based on the tool type; and means for executing the control routine to generate a control action for the selected tool.

\* \* \* \* \*